United States Patent [19]

Hummel

[11] 4,323,054

[45] Apr. 6, 1982

[54] SOLAR ENERGY COLLECTION SYSTEM

[76] Inventor: Richard L. Hummel, 87 Boulton Dr., Toronto, Ontario, Canada, M4V 2V5

[21] Appl. No.: 962,405

[22] Filed: Nov. 20, 1978

Related U.S. Application Data

[63] Continuation-in-part of Ser. No. 761,187, Jan. 21, 1977, Pat. No. 4,126,270.

[30] Foreign Application Priority Data

Jan. 23, 1976 [GB] United Kingdom ................. 2595/76

[51] Int. Cl.$^3$ ............................................... F24J 3/02
[52] U.S. Cl. .................... 126/449; 126/428; 126/431; 126/435; 126/444
[58] Field of Search ............... 126/428, 429, 435, 444, 126/445, 449, 431; 165/485

[56] References Cited

U.S. PATENT DOCUMENTS

| | | | |
|---|---|---|---|
| Re. 30,136 | 11/1979 | Schriefer, Jr. | 126/449 |
| 3,974,822 | 8/1976 | Patil | 126/901 |
| 4,072,142 | 2/1978 | Lof | 126/449 |
| 4,073,282 | 2/1978 | Schriefer, Jr. | 126/449 X |
| 4,103,598 | 8/1978 | Cooper | 98/31 |
| 4,123,003 | 10/1978 | Winston | 126/427 X |
| 4,141,338 | 2/1979 | Lof | 126/449 |
| 4,147,300 | 4/1979 | Milburn, Jr. | 126/429 |
| 4,159,707 | 7/1979 | Miguel | 126/429 |

*Primary Examiner*—Larry Jones

*Attorney, Agent, or Firm*—Rogers, Bereskin & Parr

[57] ABSTRACT

A solar energy collection system for a building is described. A solar energy collector is disposed at the exterior surface of the building and includes a solar energy absorbent body having a surface which is exposed to sunlight and from which solar energy can be transmitted as sensible heat. A panel which is transparent to sunlight is spaced from the said surface of the absorbent body so as to define therewith a passageway in which air contacts at least a substantial area of said surface so that air in said passageway absorbs heat transmitted from said surface when the collector is in use. The passageway has an inlet and an outlet and the absorbent body and panel are arranged with the outlet higher than the inlet so that heated air in the passageway tends to rise by convection towards the outlet. The building is provided with heating means including a circulation circuit for a heating fluid. Heat exchange means are coupled to said air passageway outlet of the solar energy collector for passage of heated air therethrough. The heat exchange means are also coupled to the circulation circuit of the building heating means and are arranged to permit heat transfer between said heated air and the heating fluid. A return air flow conduit is coupled between the heat exchange means and the inlet of the air passageway of the solar energy collector for returning heated air from the heat exchange means to the air passageway for recirculation.

10 Claims, 15 Drawing Figures

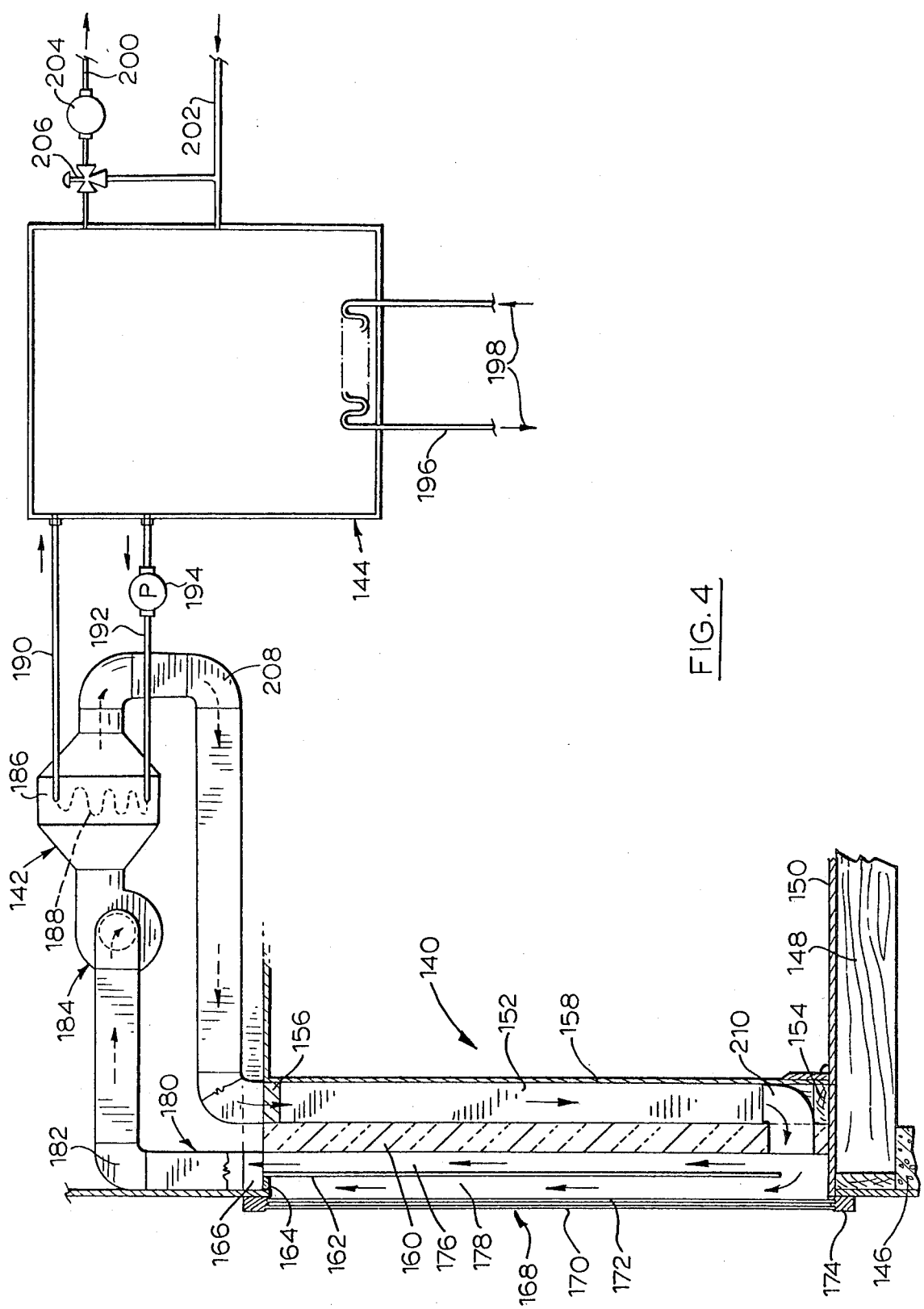

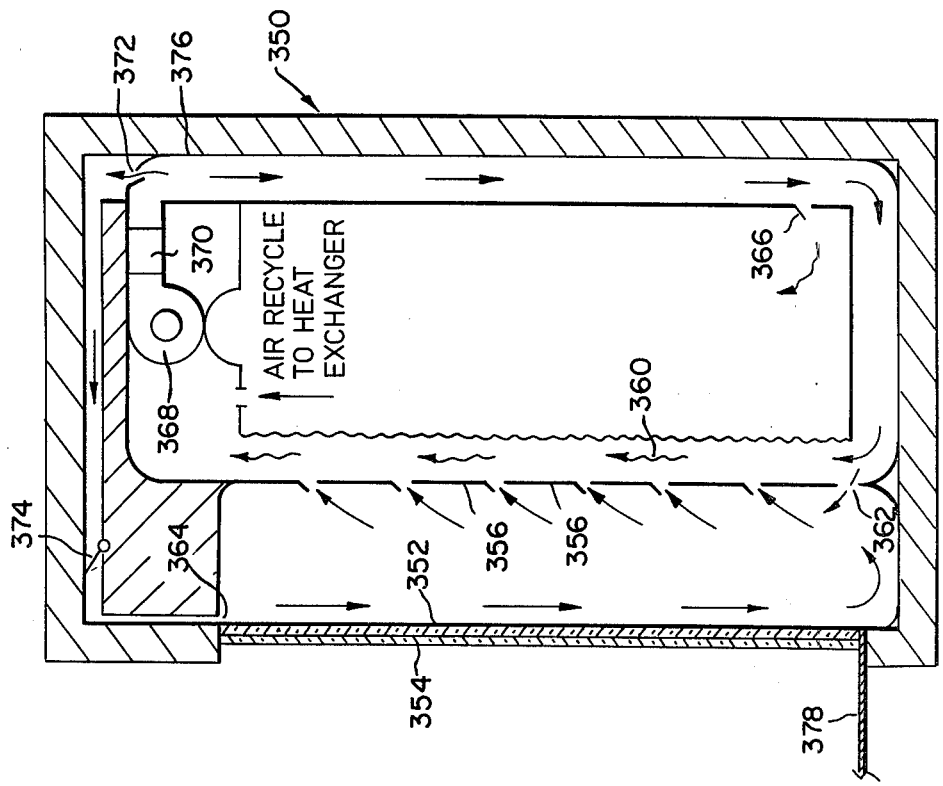
FIG. 10
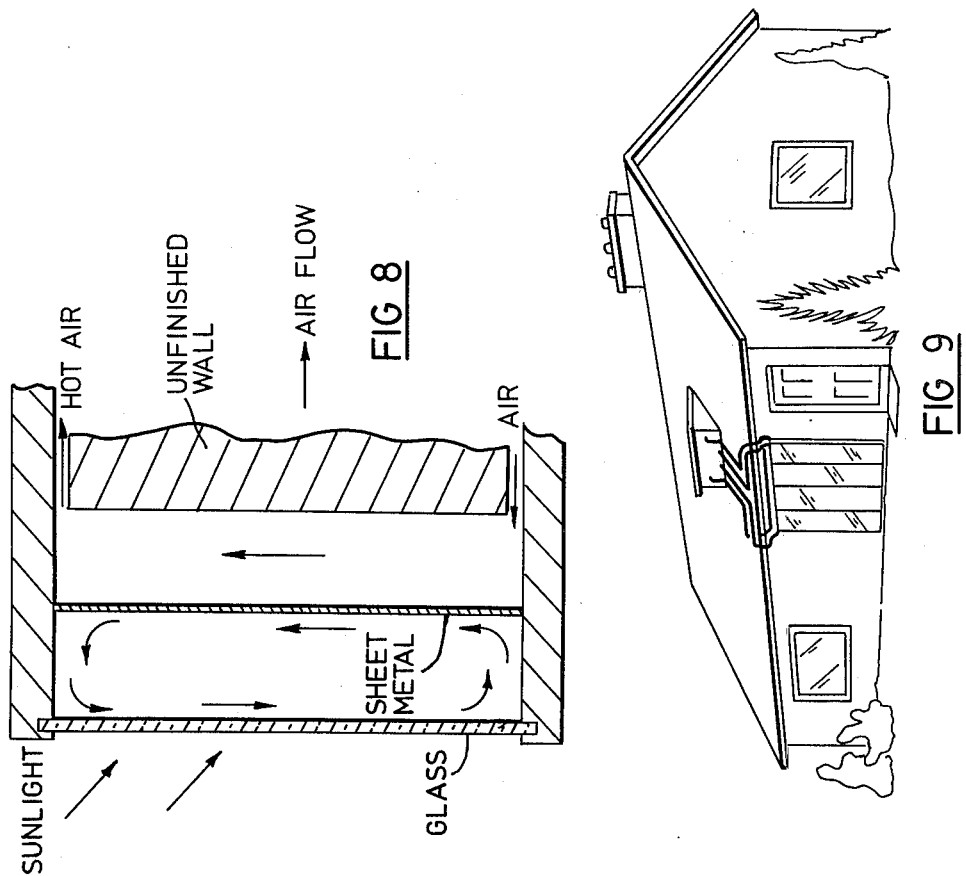
FIG 8
FIG 9

SOLAR ENERGY COLLECTION SYSTEM

This application is a Continuation-In-Part of copending application Ser. No. 761,187 filed Jan. 21, 1977 now U.S. Pat. No. 4,126,270 issued Nov. 21, 1978.

This invention relates to solar energy collection systems for buildings.

Solar collection systems have previously been proposed in which water is pumped through solar panels exposed to sunlight. The panels have black inner surfaces which are heated by the sunlight and from which heat is transmitted to the water. The heated water leaving the panels may be stored or used directly, for example, for domestic heating. However, such systems have been relatively expensive, both in terms of the capital costs for the components and for their installation and in terms of the cost of operating the equipment required to pump the water through the solar panels. Since the water is exposed to ambient air, freezing of the water may also be a problem in low temperature environments. A further factor is that the solar panels have a relatively high heat capacity, with the result that a significant amount of heat is lost when the sun is obscured.

An object of the present invention is to provide an improved solar energy collection system for a building.

According to the invention, a solar energy collector is disposed at the exterior surface of the building and includes a solar energy absorbent body having a surface which is exposed to sunlight and from which solar energy can be transmitted as sensible heat. A panel which is transparent to sunlight is spaced from the said surface of the absorbent body so as to define therewith a passageway in which air contacts at least a substantial area of said surface so that air in said passageway absorbs heat transmitted from said surface when the collector is in use. The passageway has an inlet and an outlet and the absorbent body and panel are arranged with the outlet higher than the inlet so that heated air in the passageway tends to rise by convection towards the outlet. The building is provided with heating means including a circulation circuit for a heating fluid. Heat exchange means are coupled to said air passageway outlet of the solar energy collector for passage of heated air therethrough. The heat exchange means are also coupled to the circulation circuit of the building heating means and are arranged to permit heat transfer between said heated air and the heating fluid. A return air flow conduit is coupled between the heat exchange means and the inlet of the air passageway of the solar energy collector for returning heated air from the heat exchange means to the air passageway for recirculation.

In this connection, it is to be noted that the term "heating means" used in this application is intended to denote any form of heating load in the building and includes both space heating systems such as hot water radiator circuits and systems for storing heat. For example, it may be advantageous to transfer heat from the air in the solar energy collector to a fluid such as water in a storage tank. Water is a convenient storage medium becuase it has a relatively high heat capacity. Also, water is inexpensive and can be moved using minimal amounts of energy, for example, to a storage facility in the basement of a building.

In order that the invention may be more clearly understood, reference will now be made to the accompanying drawings which illustrate a number of embodiments of the invention by way of example. In the drawings:

FIG. 4 is a diagrammatic illustration of a solar energy collection system according to a second embodiment of the invention;

Figures 1, 2:
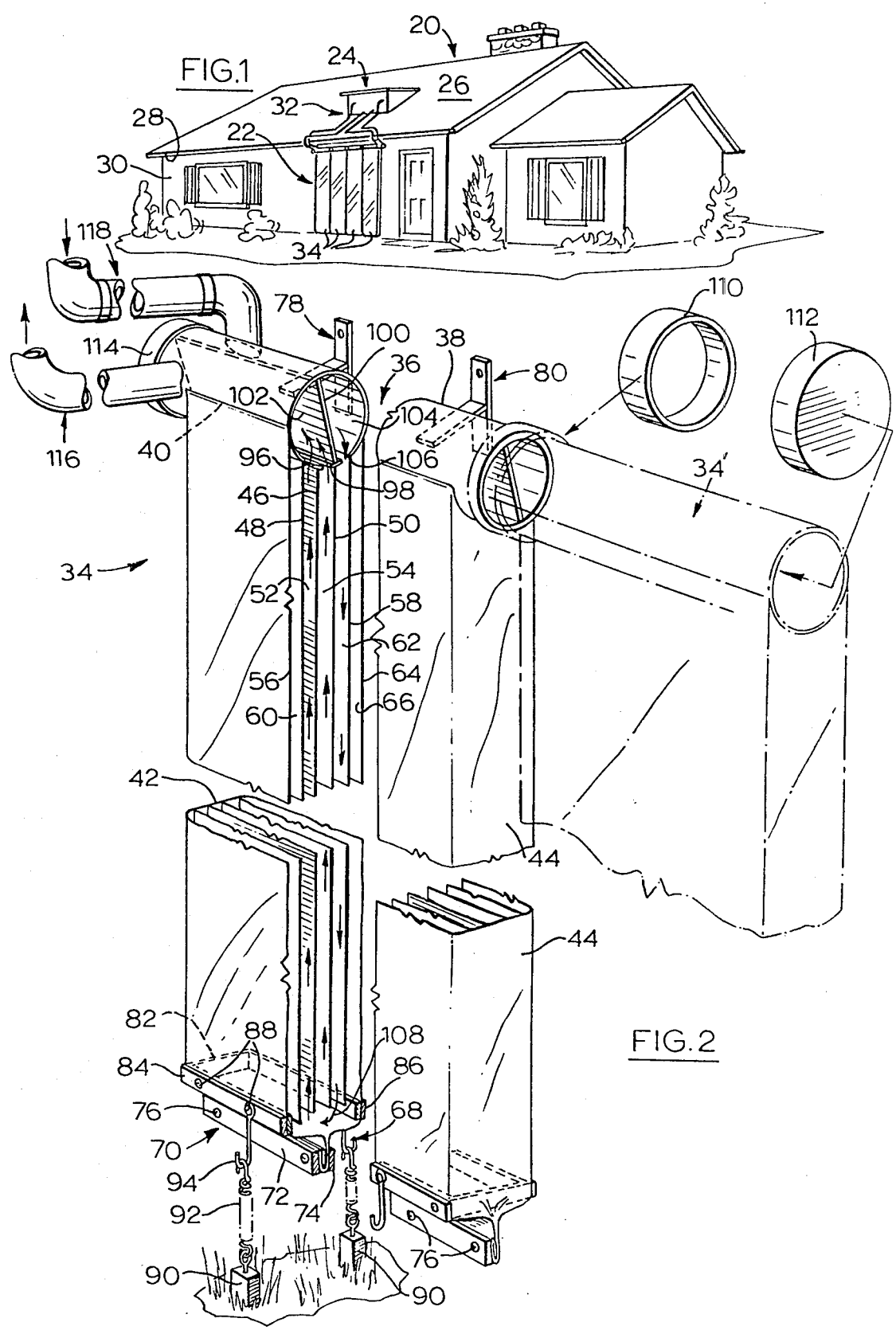
FIG. 1 is a perspective view of a dwelling house having a solar energy collection system.
FIG. 2 is a perspective view, partly in section, of the solar energy collector used in the system of FIG. 1.

Reference will first be made to FIG. 1 which shows a dwelling house, generally denoted 20, having a solar energy collection system including a solar energy collector indicated at 22 and a heat exchanger 24 mounted on the roof 26 of the house. The collector 22 is suspended below the eaves 28 of the house and hangs down the exterior surface of a wall 30. Preferably the wall 30 faces south (in the northern hemisphere) for maximum exposure to sunlight. The house has a conventional hot water radiator heating system which is coupled to the heat exchanger 24 as will be more specifically described later. The solar energy collector 22 is also coupled to the heat exchanger by ductwork generally indicated at 32.

In this embodiment, the collector 22 is of modular construction and comprises four individual units 34 disposed side by side on wall 30. Although four units have been shown, it is of course to be understood that the collector may be made up of any appropriate number of units. FIG. 2 is a perspective view showing the unit 34 which appears at the left in FIG. 1, and is sectioned at 36 to show internal structure. The adjacent unit is shown in chain line at 34' in FIG. 2. The unit shown in full lines in FIG. 2 will now be described as representative of any one of the units.

Unit 34 includes a section 38 of insulated plastic pipe from which a plurality of thin and flexible plastic panels are suspended. In this case, six panels depend from pipe section 38 longitudinally thereof. The panels are disposed in spaced parallel positions and are secured to pipe section 38 along their upper margins by a conventional solvent adhesive as indicated at 40 in the case of the outer panel. End panels 42 and 44 are provided at respectively opposite ends of the unit and the six longitudinally extending panels are sealed to the end panels at their end edges. The upper margins of the end panels 42 and 44 are also sealed to the pipe section 38.

In FIG. 2, sunlight is incident on unit 34 from the left. The third panel viewed from the left and denoted 46 forms the solar energy absorbent body of collector unit 34. This panel is coloured black and is indicated by a somewhat darker line than the other panels, although it need not necessarily be thicker than the other panels. The panels on respectively opposite sides of panel 46 are denoted respectively 48 and 50 and define with panel 46 heated air passageways 52 and 54 respectively. Spaced outwardly from panels 48 and 50 are two further panels 56 and 58 respectively. Panel 56 is the front panel of the unit and defines with panel 48 an air space 60 which is closed at its upper end and which serves as insulation against heat loss from passageway 52. Panels 50 and 58 together define a passageway 62 along which air is returned from the heat exchanger 24 to the passageways 52 and 54 as will be described. The last panel is denoted 64 and forms the rear panel of the unit. Together with panel 58, panel 64 defines an insulating air space 66 which essentially performs the same function as air space 60 but at the inner side of the unit 34.

The front and rear panels 56 and 64 respectively and the end panels 42 and 44 are somewhat longer than the internal panels and are folded together as indicated at 68 to close the bottom end of the unit. The intention is that the units 34 will be sold as part of "retrofit" kits for existing buildings and that the units will be made available with panels of standard lengths. The purchaser will trim the internal panels generally to the same length according to the height of the wall to which the unit is to be fitted. The excess portions at the lower ends of the exterior panels of the unit will then be rolled up as indicated at 68 and fitted with a clamp 70. In this embodiment, clamp 70 is made up of two bars 72 and 74 secured together by screw 76 passing through the panels.

The unit is suspended from the pipe section 38 by way of brackets 78 and 80 secured to the house wall. At its lower end, the "bag" formed by the front and rear panels 56 and 64 and the end panels 42 and 44 is kept open by an internal metal frame 82 held in place by front and rear clamping bars 84 and 86 secured to the frame by screws indicated at 88 passing through the relevant panels. The holes made by the screws in the panels allow some leakage of air into and from the unit to compensate for changes in the volume of the air inside the unit as it is heated and cools. As an alternative to or in addition to these holes, leakage openings may be deliberately provided in the outer panels for this purpose. In any event, in the illustrated embodiment, the lower end of the unit is held in place by pegs 90 driven into the ground and connected by springs 92 to hooks 94 held in place by the screws 88 referred to above.

In use, solar energy is absorbed by the black panel 46 of unit 34. This energy is transmitted as sensible heat to the air in the passageways 52 and 54 on opposite sides of the panel 46. The air in passageway 52 also receives heat directly due to the "greenhouse effect" of panels 48 and 56. As the air in passageways 52 and 54 is heated, it rises by natural convection as indicated by arrows in FIG. 2. Pipe section 38 is formed with longitudinal slots 96 and 98 which communicate with passageways 52 and 54 respectively and through which this heated air passes into the pipe section. A transverse partition 100 in pipe section 38 divides the section into a heated air chamber 102, into which slots 96 and 98 open, and a return air chamber 104. A further slot 106 in the pipe section provides communication between chamber 104 and the return air passageway 62 defined between panels 50 and 58 of unit 34. Chamber 104 receives air returning from the heat exchanger 24 as will be described and allows this air to pass into passageway 62. It will be noted that the lower ends of the internal panels of unit 34 are free and terminate slightly short of the bottom of the unit. Accordingly, this return air can flow from passageway 62 into the heated air passageways 52 and 54 as indicated by the arrows 108 in FIG. 2. It will be appreciated that the air in the outer air spaces 60 and 66 is essentially static and that, although these spaces communicate with the inner passageways, there will in fact be no air flow between the air spaces and the passageways.

As indicated above, the solar energy collector units 34 are modular and the number of units used will depend on the required overall size of the solar energy collector. In this embodiment, each unit is of the following approximate dimensions: height—20 feet; width—3 feet; depth—8 inches. The units are disposed side-by-side and are fitted together by way of their pipe sections 38. The air chambers 102 and 104 of the sections cooperate to define common heated air and return air ducts extending along the top of the collector. There is no communication between the air passageways of adjacent units other than by way of the pipe sections.

As can be seen from FIG. 2, the pipe sections 38 of adjacent units are butted together end to end. A collar 110 is fitted around the joint and secured air-tightly to both pipe sections by a conventional solvent adhesive. The appropriate number of sections are assembled in this way and the outer ends of the two endmost sections are fitted with a closure cap which is also secured by solvent adhesive. A cap to be fitted to the right hand end of the collector in FIG. 2 is indicated at 112 and part of a similar cap 114 is visible at the left hand end of the collector.

As discussed above, the pipe sections, when assembled in this way, co-operate to define air ducts extending along the top of the solar energy collector. The duct formed by the chambers 102 of the pipe sections carries outgoing heated air to the heat exchanger 24, while the duct formed by the chamber 104 carries return air. Ducts formed by insulated plastic pipe are provided adjacent respectively opposite ends of the collector unit for carrying the heated air to and the return air from the heat exchanger 24. This ductwork is generally indicated at 32 in FIG. 1. Part of two ducts for the left hand end of the solar energy collector is visible in FIG. 2. Similar ducts are provided at the opposite end of the collector but have not been shown in this view. The ductwork is assembled from insulated plastic pipes and elbows secured together and to the relevant pipe section 38 by solvent adhesive. The pipes carrying the heated air from the collector to the heat exchanger 24 are indicated at 116 and the return pipes at 118. It will be noted that the pipes initially extend outwardly and then upwardly to clear the eaves of the building. Appropriate retaining brackets will be provided for securing the ductwork if appropriate, although for simplicity of illustration, they have not been shown in the drawings.

Figure 3:
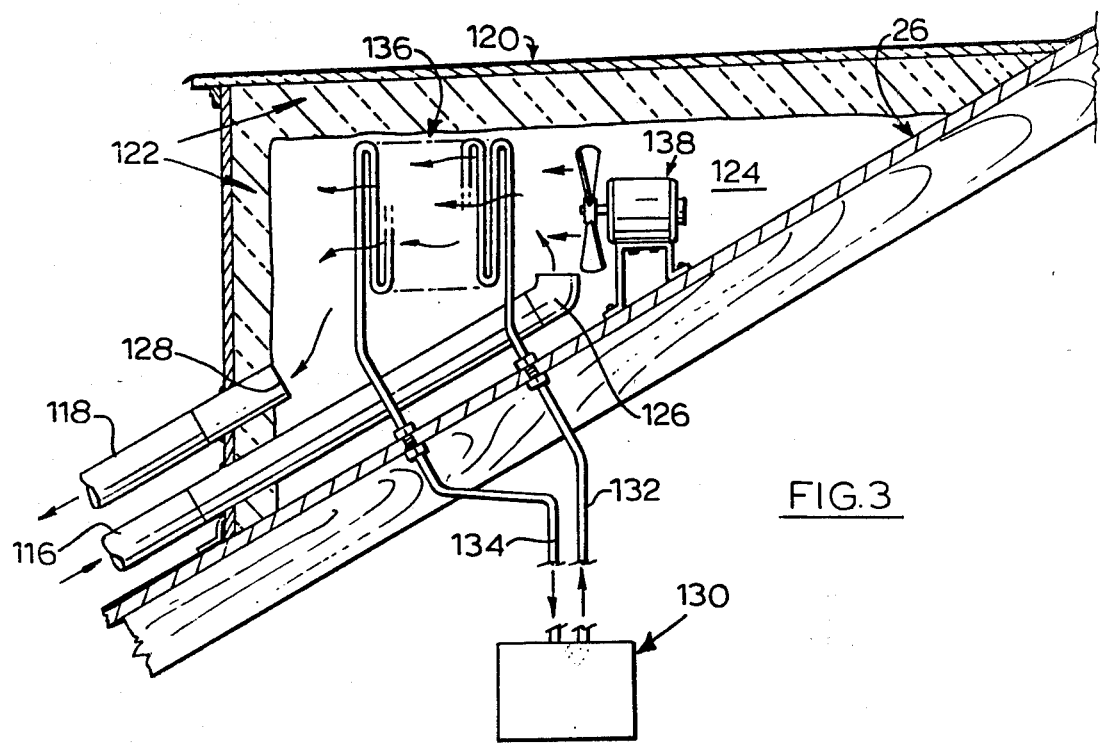
FIG. 3 is a vertical sectional view through the heat exchanger used in the system of FIG. 1.

Reference will now be made to FIG. 3 in describing the heat exchanger 24. The heat exchanger is formed by a weatherproof and airtight enclosure 120 which is built onto the roof 26 of the house. The enclosure is heavily insulated to minimize heat loss to the ambient air as indicated at 122.

Part of the ductwork 32 coupling the heat exchanger and the solar energy collector is visible in FIG. 3. The pipe carrying heated air from the collector to the heat exchanger is denoted 116 and the return pipe is denoted 118 (in correspondence with FIG. 2). Pipe 116 extends into the space 124 defined by enclosure 120 and terminates in an outlet fitting 126 from which heated air flows generally upwardly as indicated. In contrast, the return air pipe 118 terminates at 128, just inside the air space.

Heat exchanger 24 is also coupled to the hot water heating system of the house 20. The system is indicated diagrammatically at 130 in FIG. 3 and includes flow and return pipes 132 and 134 which are taken up into the roof of the building and coupled to a heat exchange coil 136 inside enclosure 120. Accordingly, hot water for the heating system 130 flows through coil 136. It will be seen that the coil is positioned adjacent the heated air outlet 126 in enclosure 120. A fan 138 is located in front of coil 136 on the opposite side of outlet 126 so as to blow the heated air over the coils. Accordingly, assuming the air is at a higher temperature than the water in the coil 136, heat will be transferred from the air to the water and can be used in the heating system 130.

When the solar energy collector 22 is exposed to sunlight, solar radiation heats the solar energy absorbent panel 46 in each of the units 34 of the collector and the heated air rises by natural convection and enters the heated air chamber 102 of the relevant pipe section 38 at the top of the unit as described above. From there, the heated air passes into the nearest heated air outlet pipe 116 and up to the heat exchanger 28, will by natural convection. The upward movement of heated air in the passageways 52 and 54 in turn draws air downwardly in the return air passageway 62 of each of the collector units 34. This air flow draws air from the return air chamber 104 of the relevant pipe section 38 and, through the pipes 118 from the internal air space of heat exchanger enclosure 120. Accordingly, air recirculates through the solar energy collector units 34 and heat exchanger enclosure 120. Heat is removed from the air in enclosure 120 by the water flowing through the coil 136 (assuming the air is at a higher temperature than the water) and the cooled air returns to the collector for reheating. Thermostatic controls (not shown) may be provided to ensure that water flows through coil 136 only when the air temperature is higher than that of the water.

A primary advantage of this system is that the circulation of air occurs by natural convection and does not require blower assistance. The fan 138 in the heat exchanger serves merely to blow the heated air over the coil 136 and has negligible effect on the main air circulation. A further advantage of the system is that there is minimal heat loss when the sun is obscured and solar energy is no longer collected. When this happens and the air inside heat exchanger 24 begins to cool, heat will retransfer from the water in coil 136 to the air in the heat exchanger when the temperature of the air falls below that of the water. The circulation of air in the system will stop and the heated air will remain in the enclosure 120 of the heat exchanger. When sunlight again begins to fall on the collector, air circulation will be re-established and the heated air in enclosure 120 will transfer back to the water when the temperature of the air rises above that of the water.

The solar energy collection system described with reference to FIGS. 1 to 3 is primarily designed as a "retrofit" system; that is, a system to be installed on existing buildings. The equipment used in the system will be made available in the form of a kit. The installer will buy a number of collector units appropriate to the wall area to be covered and will assemble the units and trim the plastic panels to size as described above.

FIG. 4 is a diagrammatic illustration of a "built-in" type of solar energy collector system which might be incorporated in a new house during construction. The drawing shows a vertical sectional view through part of the wall 140 of the house. A heat exchanger is indicated at 142 and the water storage tank at 144.

Part of the basement wall of the house is visible at 146 and supports floor joists 148 and a floor covering 150 in conventional fashion. Wall framing comprising vertical studs 152 extending between plates 154 and headers 156 is supported on the joists. Drywall is applied to the inner faces of the joists as indicated at 158. A layer 160 of insulation is applied externally of the wall framing.

Spaced outwardly from the insulation 160 is a solar energy absorbent body formed by a sheet 162 of aluminum foil suspended from a support 164 which extends longitudinally of the wall and which is itself attached to cross members, one of which is indicated at 166, spaced along the wall. In this embodiment, the foil sheet 162 is of twenty gauge thickness and its external surface is painted a selective black. Spaced outwardly of the foil sheet 162 is a double glazed glass panel comprising spaced parallel sheets of glass 170 and 172 in a frame 174.

As a result of this construction, two vertical air passageways 176 and 178 are provided on respectively opposite sides of the aluminum foil sheet 162. As in the previous embodiment, solar radiation incident upon the wall 140 is absorbed by the solar energy absorbent body 162 and is transmitted as sensible heat to the air in the passageways 176 and 178. The "greenhouse effect" will also contribute to heating the air in the outer passageway 178. In any event, this heated air will then tend to rise by natural convection as indicated by the arrows in the passageways.

At their upper ends, the passageways 176 and 178 enter a collection header 180 which merges into a hot air duct 182 similar to the type of duct used for conventional forced air heating systems. Duct 182 communicates with a blower 184, the outlet of which is coupled to the heat exchanger 142. Heat exchanger 142 is formed by an enclosure 186 defining an internal air space in which a hot water coil 188 is fitted. Coil 188 is coupled to the hot water storage tank 144 referred to above by flow and return lines 190 and 192. A pump 194 is provided in line 192 for circulating water from the tank through coil 188. A so-called "extender coil" 196 is provided in tank 144 and is coupled to the domestic hot water system of the house as indicated by arrows 198. Tank 144 also communicates directly with a domestic radiator-type heating system of the house by way of flow and return lines 200 and 202 respectively. A pump 204 circulates water in the radiator system. A diverting valve 206 controls the heating system.

Referring back to the heat exchanger 142, air leaving enclosure 186 enters a return air duct 208 which communicates with the air space between two adjacent studs 152 in the framing of wall 140. The header 156 of the wall framing is apertured to permit air to pass therethrough. The air space between the studs defines a return air passageway and communicates at its lower end with an elbow 210 inserted through the insulation 160 of wall 140. The elbow in turn communicates with the two air passageways 176 and 178 adjacent the aluminum foil sheet 162.

The system shown in FIG. 4 operates in essentially similar fashion to the system described with reference to FIGS. 1 to 3, except in that the air circulation is fan assisted. However, it is to be noted that the primary purpose of the fan to ensure intimate contact between the incoming heated air and the hot water coil 188 rather than to actually effect circulation of the air in the system. Circulation would in fact occur naturally as a result of convection currents in the absence of fan 184.

Figure 5:
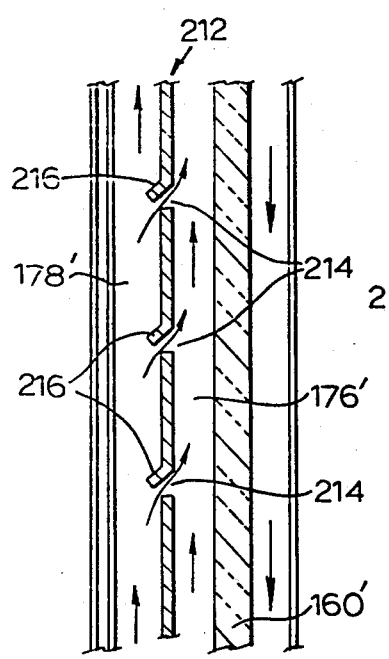
FIGS. 5, 6 and 7 are diagrammatic illustrations of three possible modifications of the system shown in FIG. 4; and, FIGS. 8 to 15 disclose further embodiments of the invention and will be more specifically described later.
Figure 6:
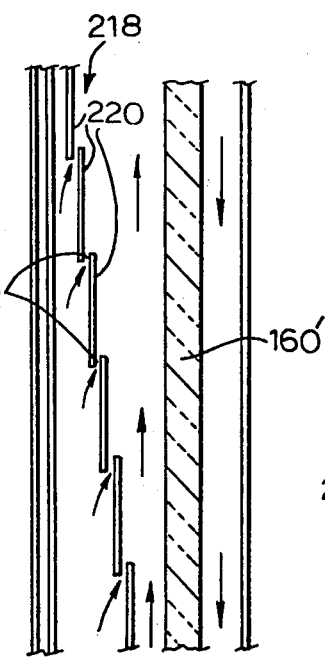
Figure 7:
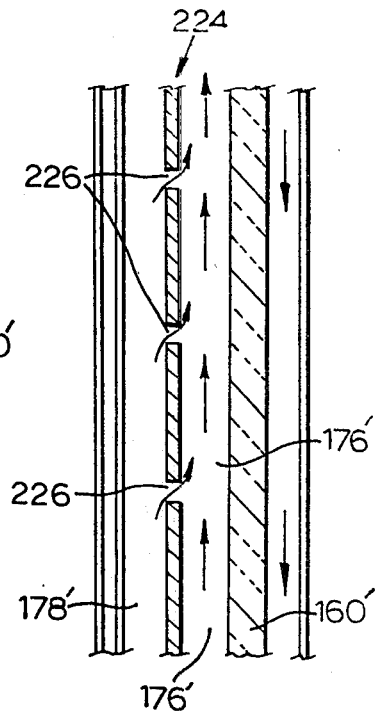

FIGS. 5, 6 and 7 show alternative forms of solar energy collectors which may be used in the system of FIG. 4. Each of these views shows a part of a wall of the type shown in FIG. 4 but in which the solar energy absorbent body is of slightly different form. Primed reference numerals have been used in FIGS. 5, 6 and 7 to denote parts which correspond with parts of FIG. 4. In all of these embodiments, the solar energy absorbent body has been designed with the "boundary layer effect" in mind. Thus, it is known that air adjacent the solar energy absorbent body of the collector will initially rise as a laminar boundary layer hugging the heated surface and flowing smoothly. As the air continues to rise, however, it becomes turbulent and mixes with the surrounding air. Referring back to the embodiment of FIG. 4, this turbulence and mixing of the heated air will tend to transmit heat to the double glazed glass panel 168 and the system will lose heat. While this heat loss may be acceptable in some practical applications, the solar energy absorbent bodies shown in FIGS. 5, 6 and 7 have been designed to minimize this loss.

Referring first to FIG. 5, the wall structure shown in that view incorporates a solar energy absorbent panel 212 formed with a plurality of transverse slots 214, the upper edge of each of which is defined by a forwardly directed flange 216 which defines an air scoop. These scoops deflect from the front air passageway 178' to the rear air passageway 176' the boundary layers of air adhering to the outer face of the body 212. The scoops are spaced vertically such that a rising boundary layer of air forming below each scoop will be deflected into the rear air passageway 176 before it becomes turbulent. In a typical installation, the slots 214 would be arranged at approximately one foot vertical spacings from one another. It will be appreciated that turbulence in the rear air passageway 176' is desirable to improve the heat transfer. The presence of the insulation 160' prevents significant heat loss from the system.

FIG. 6 shows a heat energy absorbent body 218 formed by a series of flat vertical plates 220 arranged in an ascending sequence with each plate above the lower plate spaced slightly further from the insulation 160' than the plate below and with its bottom margin overlapping the upper margin of the lower plate so as to define horizontal slots similar to the slots 214 of FIG. 5. These slots have the same effect as the slots 214 in directing into the rear air passageway 176' boundary layers of air forming on the outer surfaces of the plates 220.

Finally, FIG. 7 shows an arrangement which employs a solar energy absorbent body 224 in the form of a flat plate formed with vertically spaced horizontal slots 226. This form of body can be used where the volume of air flowing in the rear passageway 176' is greater than the volume of air flowing the front passageway 178' and if the slots 226 are dimensioned appropriately to cause the boundary layer to transfer from the front passageway to the rear passageway. If the pressures are the same at the base of the collector, the increasing buoyancy of the air in the rear passageway 176' will lead to a reduction in the pressure of the air in that passageway and will tend to cause air to transfer from the front passageway to the rear passageway. The motion of the air in the rear passageway can be periodically accelerated to reduce its pressure by Bernoulli's principle.

It should finally be noted that, while the preceding description relates to specific embodiments, many modifications are possible within the broad scope of the invention. For example, while the heat energy collection system shown in FIGS. 1 to 3 of the drawings relies on convection currents to provide air circulation, the circulation could be fan assisted. Conversely, the fan could be omitted from the FIG. 4 embodiment. Particularly where the heat exchanger is positioned lower than the top of the solar energy collector, it may be necessary to provide for fan assistance in order to establish an air circulation.

In the embodiments described, the solar energy collector is arranged vertically, although it is to be understood that this is not essential. The collector could be inclined provided the air can still rise by convection.

In the illustrated embodiments, air passageways are provided on both sides of the solar energy absorbent body. In an alternative embodiment, a single air passageway may be provided at the side of the body which is exposed to sunlight. Also, the described insulating air passageways could be omitted.

It is also to be noted that structural details of the system may vary from those shown in the drawings. For example, in the embodiment of FIGS. 1 to 3, it is not essential that the panels of the heat energy collector units be suspended from pipe sections. The units could be essentially in the form of large plastic bags suspended directly from the building. Also, the units could be manufactured with their lower ends closed instead of employing the arrangement shown in FIG. 2 in which the plastic panels are cut to size and clamped. The panels need not even necessarily be flexible.

According to a further embodiment of the invention, the surface of the solar energy absorbent body which is exposed to sunlight may be coated with an organic compound containing from twelve to twenty-five, preferably twenty benzine rings in a straight chain. This material absorbs ultra-violet rays, visible rays (4,000–7,000 A) and infrared rays to two microns and emits only a small proportion of all the rays received. In any event, for maximum absorption, the exposed surface of the solar energy absorbent body is preferably black in colour. However, for aesthetic or decorative purposes, dark colours such as maroon or dark blue can be used without excessive loss of efficiency. It would even be possible to provide a collector having transparent outer panels and a partially transparent solar energy absorbent body so that the collector can be used over windows in a house. Obviously, an arrangement such as this would not be as efficient as a collector having a black body. However, the arrangement would allow solar energy to be collected at areas of the house (windows) which would otherwise in fact be sources of heat loss from the house.

This invention relates to the conversion of solar energy into heat and to the utilization of the heat so-produced for any of various purposes, includingd the heating of buildings, the production of domestic hot water, and for driving dehumidification and air conditioning systems in a cost effective manner.

A wide variety of solar energy collection systems have been proposed throughout the history of the U.S. patent office and the interest in such systems has greatly increased at the present time due to the increased need for sources of renewable energy. To date no system has truly been acceptable on the basis of cost effectiveness for wide spread use at the present time. The problem that must be solved is embedded in the two words separately; namely a system that can be installed at a cost that is competitive with the cost of energy from other sources and a system that is effective in meeting the energy needs. Low cost systems are available which meet a minor portion of the needs of, for example, heat in a few rooms for a relatively short period of time. There are also highly effective systems which can provide heat or heat and air conditioning to meet the major or total demand of the inhabitants, but the cost is far from competitive with conventional fuels. What is required is an engineering combination of components and methods of construction to provide the combination of high effectiveness and low cost.

The object of the present invention is to provide that combination of low cost and good effectiveness for a system for converting the energy of the sun into heat and using the heat for building heat and/or for domestic hot water and/or as a source of heat for operating an air conditioning system.

The problem of low cost and high effectiveness is complex and cannot be fully covered in this disclosure. This disclosure will however, outline some of the components of cost and effectiveness and then illustrate these components with collectors taken from the present art and with the present invention. The present invention will be compared with some of the best examples from the present art to show how it may hope to succeed where they have failed. The discussion and the comparisons will all be upon a per square foot basis.

The cost is simply the sum of all of the legitimate costs minus any legitimate credits for additional needed functions performed. It is useful to break down the cost into an incomplete set of components, because if any of these is excessive, then the total cost (being greater) must also be excessive. The converse unfortunately, is not true. Some of the components of cost would be materials, fabrication, tooling up, installation, maintenance and operation, while the credit could include the cost of siding or roofing that is made unnecessary by the collector. The total net cost for the collector system would then be compared with the total cost of the heating system it replaced. The component entitled "Tooling Up" is in consideration of the fact that some designs might be relatively inexpensive to fabricate, by large-scale mass production, but large-scale mass production can never be achieved unless the market is first developed. Thus, a system which can utilize readily available standard inexpensive components has a distinct advantage over a system which could be competitive only if it were already in large-scale mass production.

Effectiveness contains two components—the net heat that is available for use and the temperature at which this heat is available. The temperature to a large degree, determines the usefulness of the heat, as is shown in the following table.

1. If the temperature is less than room temperature, the heat is useless without the aid of a heat pump.
2. The more the heat exceeds room temperature, the less is the cost of the distribution system including heat exchangers, ducts, blowers, and/or pumps.
3. The higher the temperature is, the less the cost of storage. 4. If the temperature is greater than 140° F., the heat can be used for domestic hot water. If the temperature is greater than 170° F., the heat can be used in direct contact dehumidification (and cooling) using glycol (and water) sprays. If the temperature is greater than 210° F., the heat can be used in standard absorption refrigeration systems, such as that manufactured by AKLA for the purposes of air conditioning.

The quantity of heat that is collected depends in series, upon the quantity of solar radiation intercepted by the collector, the fraction of this that is converted into heat on a "black" surface and not reflected from a cover or the black surface or blocked from reaching the black surface, and it depends most of all upon what fraction of this heat is then lost. The heat lost depends upon the temperature. The relationship of this heat loss to the working fluid temperature and other factors is the major determinant of how effective a solar collector is.

This invention can best be understood by considering the common features of current collection systems and their cost, and then considering the differences described in this invention and its effect on performance and cost.

Essentially, all solar collection systems have certain features in common. There must be a surface(s) or volume(s) at which or in which the solar radiation is converted into heat. Since such a surface must absorb and not reflect the radiation it must either be black or a dark colour and it will be referred to as the black or absorber surface. There should be some way to reduce the rate of heat loss to the outside without interfering excessively without the access of the solar radiation to the black surface in order that a larger fraction of the heat can be utilized. There must be some method or means of transporting the heat from the black surface to where it is to be used and this function is typically performed by a "working fluid" usually air or water. Finally, there should be some means of storing heat not needed at one instance so that it can be used at later times. Otherwise, the solar collection facility will be useful for only a small fraction of the total time.

In order to reduce heat losses from the black surface to the exterior, it is necessary to prevent the wind from blowing against the black surface and carrying the heat away, and it is necessary to block direct long wavelength radiation (i.e. 10 microns) from the black surface to the exterior, and it is necessary to block convection of the heat by air from the black surface to the exterior while at the same time permitting the sun's radiation to reach the black surface. Typically this function is performed by one or more transparent covers which form planes parallel to the black surface, but other improvements such as honeycombs or parallel layers of transparent material which are oriented horizontally or at right angles to the absorber and cover have been used to reduce convection. Even more heat is carried by long wavelength radiation. This is reduced by a factor of 2 or 3 at most by using transparent materials which are in fact opaque to an absorbent of long wavelength radiation (i.e. glass), but it can be reduced by a factor of up to 20 by the use of a "selective black" on the absorber surface.

Consider first three simple and standard systems and their defects. An ordinary building with south facing windows represents a simple, inefficient, low cost, collection system in which the solar radiation enters through the windows and it is in large part absorbed and converted into heat by even light coloured surfaces before it undergoes sufficient reflections to exit through a window. The working fluid is the air of the room and any heat storage is provided by the walls and objects in the room. The system can be improved by forced air circulation which mixes the air from the solar heated rooms with the air from other rooms and the heat storage can be improved by more massive walls, by barrels of water or by any means that increases the heat capacity. In particular, the windows that permit the solar radiation to enter also cause substantial heat losses at night. Such a system can be considerably improved by providing a means of insulating the windows when they are not admitting solar radiation.

The most common effective collector system uses water as a working fluid and has the black surface on a thick sheet of copper or aluminum and has tubes attached or channels formed in the metal. Heat loss is reduced by the good heat transfer from the black surface to the water in the tubes so that the temperature of the black surface is not very much greater than that of the water. The thickness of the metal surface and the spacing of the tubes are optimized to balance increased black surface temperature between the tubes and thus greater heat loss vs. the cost of the plate and the cost of attaching the tubes. Water is also used as a storage media.

There are several disadvantages to this design which will be overcome by my invention. The mass of the metal sheet and tubing of the black surface store considerable heat which extends the time to the surface remains hot after the sun ceases to shine at night or on an intermittently sunny day so that more heat is lost and less is recovered. The mass of the material and the cost of attaching the tubing to the surface add to the collector's cost. Water cannot be left in the tubes overnight on cold nights unless a substantial amount of antifreeze has been added or else the water could freeze. Since antifreeze is too expensive to be mixed with the water in storage, the use of antifreeze generally involves a separate circuit with the mixture of water and antifreeze being used as the working fluid and ordinary water as heat storage media and heat exchanger between the two. The more common solution to the problem is to have the tubes drained at all times that the tubes are not hot and to pump water into the tubes when they are hot. This adds the cost of a control system and considerably increases the heat with which the water must be pumped and thus increases the cost of pumping. Even more important, the intermittent presence of first air and then water causes severe corrosion problems which don't exist in a closed water system such as the typical home hot water radiator system. Typically, these collectors are at a slope to maximize their exposure to the sun.

Particularly on a sloped surface the water type collector is very expensive to install as it is heavy, it is awkward, and each unit must be connected by plumbing, and each is breakable. Largely because of the plumbing requirement, the collectors usually cannot be used as part of the roof but must be installed on top of a complete roof. If it is installed as part of the roof then leaks are a serious problem.

Solar collectors which use air as the working fluid tend to be substantially cheaper and also substantially simpler, but they also tend to be less efficient even when operating at substantially lower temperatures which means of course, their effectiveness is substantially lower. An illustration of these points is given by the "TROMBE WALL" which is one of the simplest and cheapest of these solar collectors. The TROMBE WALL essentially consists of painting a south facing wall (usually concrete) black and placing a glass wall at a little distance in front of the wall, so as to form an enclosed space in which the sun shining on the wall heats the wall which in turn heats the air in this space. In the winter, vents are adjusted so that the heated air flows into the house and is replaced either by cooler air from the house or possibly in part by air from outdoors. It is a passive system in that it works when the sun is shining and otherwise stops. It is inexpensive because it is vertical and it is simple to produce and either the concrete wall or the glass cover or both in combination serve as siding to complete the wall of the house. In the summer the hot air is vented to the outdoors and the TROMBE WALL acts as a pump to suck out hot air from the house and therefore suck in cooler air from outdoors. The TROMBE WALL is very inefficient because heat transfer between the walls and the air is poor leaving the wall to be substantially higher then temperature than that of the air it is heating leading to substantial radiation losses from the wall to the glass. Furthermore, the heated air generally becomes turbulent and the heat is carried directly to the glazing. In the hot water system the water is not only fairly close in temperature to that of the black surface but also the air which carries the heat to the glazing is at a much lower temperature than that of the water.

The efficiency of an air collector can be improved somewhat by using blackened sheet metal between the front glazing and the rear wall so that the two air conduits are formed and heat transfer to the air is improved with a lowering of the black surface temperature. Usually in this case, a blower is used to force the air through the rear duct at a higher speed and with greater turbulence so as to improve the heat transfer and also usually to force the air through rocks or other storage medium. Usually the front space is then left stagnant to serve solely as insulation, as is shown in FIG. I. By increasing the power input to the blower and by using fins on the black surface of the metal plate, one can increase the heat transfer coefficient very substantially and reduce the excess temperature and thus reduce the heat loss from the front of the metal plate. Both add the initial investment and the power consumption of the blower is an operating expense. Some systems have operated with such large blowers that the heat from the electrical power to the blower is almost equal to the solar heat collected. One manufacturer of such a system has improperly claimed that heat in calculating a high efficiency for his collector system. It might be noted that almost all of the improved collector systems and sometimes the TROMBE WALL are preferably placed at a slope so as to "optimize" the collection of solar energy.

There have been various patents on methods to obtain relatively high efficiencies in air systems without excessive power consumption. For example, G.O.G. Löf proposed a system in which a set of overlapping glass plates is used where the plates might be a few inches in one direction by several feet in another. One side of the glass is painted black and it is placed away from the sun. In operation, the sun's radiation is absorbed by the black paint and the heat flows from both the front and back sides of the plate into air that is drawn from the front of the array of these glass plates to the rear. The portion of the plates first exposed to the air will be the coolest and it is only these portions that can radiate directly to the outside, because the rest of the plate is overlapped by another plate. The air enters the rear duct from having been in contact with the hottest portions of the glass plates for these portions are covered. As a result of this more or less countercurrent action, the air can be raised to a higher temperature without excessive heat losses by radiation. Convection is also prevented because the air is drawn from the front where it could enter into convection heat loss to the rear as it is accumulating heat. The chief drawback of such a system is that it would be expensive to construct. The patent description of this system presents its use solely in a sloped collector which costs much more to install.

The present invention is a judicious combination of science, particularly the science of fluid mechanics and heat transfer and of art, particularly the art of house construction, handling of materials, electroplating selective black surfaces, and of building heating. The objective of this combination is to provide solar heating and possibly cooling in a cost effective manner. The invention must give a balanced consideration of both the cost per unit area of collector and the effectiveness per unit area and attempt through design to improve both. The effectiveness of the solar collection system includes the amount of heat that can be collected per unit area as a function of instantaneous and average conditions and also includes the utility of the heat which can depend upon the temperature level, the time of the year, and the provisions for utilizing the heat. The collector may also serve other useful purposes which must be otherwise provided in the building design and construction. This could be considered under effectiveness but it is more convenient to be considered under cost and to reduce the cost per unit area of the system by the cost that is saved in otherwise providing for this function.

One element of art that will be considered is the art of building construction and the invention will be designed to well fit into standard construction techniques and to utilize the lowest cost approaches that are available. The invention will recognize that the art of handling materials while operating on a vertical surface whether using normal scaffolding or whether using pulleys mounted at the top of the wall are substantially easier and cheaper than operating upon steeply sloped roofs. The invention will recognize that the art of producing dependable and effective selective surfaces by electroplating a surface called chrome black is very much less expensive when it can be done to flexible strip than when it is applied to larger rigid surfaces. The reason for this is simply that producing a chrome black surface calls for extremely high currents per square foot and that most collector designs require that a large area must be plated at one time or a laminate be used. If, however, flexible strip can be used, then this strip can be run over a roller so that only a small portion of it contacts electroplating solution at any one time so that the total current is reasonable because the area being plated is small. The invention will make full use of standard air-water heat exchangers and the art of using them for heating them or cooling a building. Typically, such exchangers are finned on the air side to provide for additional heat transfer area and they are designed for heat transfer enhancement by the turbulence of the air flow. Typically when large areas of surfaces are required, the units are used one behind the other so as to reduce the cross section per air flow and thus increase the air velocity and also to permit the heat transfer to occur in a more or less countercurrent manner. The art of storing heat most cheaply involves the use of large water tanks either built into the ground or resting on the ground and the art of heat storage has developed means of stratifying the water based upon its temperature.

The science of heat transfer will be thoroughly exploited in an attempt to maximize the heat transfer coefficient for transfer from the collector plates to the air that it utilized and to minimize the heat loss to the surroundings. The energy input to the system from the sun is entirely by radiation concentrated between the wavelengths of 0.3 microns to 2.1 microns while radiation between 4.0 microns to 40.0 microns is often the largest component of the heat loss flow between the collector plate which absorbs the solar radiation and the inner glazing. The solar radiation converted to heat depends upon the transmission of the glazing which increases for a lower index of refraction for smooth surfaces, and upon the absorptivity or emissivity (which are the same) of the collector surface for the wavelengths of the solar radiation. In regard to heat loss, typical glazing absorbs rather than transmits over the majority of the range of the wavelength for loss. The heat flow is proportional to the differences in the fourth power of the absolute temperatures and the emissivities of the glazing and the collector plate for the wavelengths in question. If either emissivity can be made small, the heat flow by radiation can be made small. This is essential if our collection system is to be made efficient using air as the working fluid. Fortunately, the chrome black surface referred to earlier absorbs solar radiation at better then 90% efficiency and loses heat by radiation at less than 10% efficiency.

Once radiation is reduced, convection becomes the major mode of heat loss. The relevant fluid mechanics and heat transfer including the developing boundary layer on a vertical heated plate and the flow in heat transfer between a heated and cooled plate which are part of an enclosed space have been thoroughly studied experimentally and theoretically by, for example, (1) in the case of the vertical heated plate a boundary layer developed which for a certain distance is laminar whose thickness is proportional to the $\frac{1}{4}$th power of the height from the bottom of the plate. This layer contains the air that has been heated by heat transfer from the plate as shown by a temperature profile dropping rapidly from the plate temperature to approach the bulk temperature assymptotically at the edge of the boundary layer. The resulting buoyancy results in an upward velocity which peaks toward the centre of the boundary layer. The velocity is zero at the plate where the air is hottest and is zero relative to the bulk fluid at the edge of the boundary layer. Above a certain height the boundary layer becomes turbulent and begins to mix into the bulk. The rate of growth of the boundary layer with height and the height at which the boundary layer becomes turbulent is also proportional to the square root of the thermal conductivity divided by the heat capacity and to the inverse $\frac{1}{4}$th power of the temperature difference between the plate and the bulk fluid divided by the bulk fluid temperature. The heat transfer to this rising boundary layer is locally proportional to the same temperature difference to the 5/4th power divided by the height of the $\frac{1}{4}$th power while the total ingergal heat transfer is proportional to the temperature difference to the same 5/4th power divided by the total height of the plate to the $\frac{1}{4}$th power.

Heat transfer across an enclosed space, as in FIG. 8, where one has a hot plane facing a cold plane separated by a space that is small compared to the dimensions of the hot and cold planes has been studied and has been found to depend upon the angle. If we define a horizontal orientation with the hot plate at the bottom and the cold plate at the top as being of zero angle, so that a vertical orientation will be 90° and the horizontal position with the hot plate on top and the cold on the bottom would be 180°, solar collectors in Canada are typically tilted at 60° to 70° in order to maximize the direct radiation from the sun onto the collector. In the fluid mechanics generated by the heat flow there are three types of behaviour —one for angles from 0° to almost 90°, one for slightly under 90° to slightly under 180°, and one for around 180°. For 180°, the heat transfer is minimal because the temperature gradient tends to prevent the movement of the fluid rather than encourage it. For 0°, the flow goes up in some places and down in others forming cells of convection called Bernard cells. The size of the cells and the degree of turbulence radiated if any, depend on the spacing and upon the Grashof number. When the plane is tilted at an angle less than 90° (usually considered 80°), then flow still initially occurs in cells except the cells are elongated and that there is flow along the surfaces in the upward direction on the hot lower surface and in the downward direction on the cold upper surface. The degree of heat transfer and whether the flow is turbulent again depends upon the Grashof number and an additional dependence on the angle and upon the aspect ratio, a ratio of the length of the planes along the slope vs. the distance between the planes. For vertical slopes and for angles between 90° and 180°, the flow is up on the hot side and down on the cold side with the stagnant almost constant temperature region in between and as a cross over of hot air to the cold side at the top and cold air at the warm side at the bottom as long as the Grashof number is less than some limiting value which depends upon the aspect ratio. At higher Grashof numbers, particularly after turbulence develops, the stagnant constant temperature region disappears and the heat is transferred by direct convection from one plate to the other at points other than the top and bottom more or less as occurs in the case of the plates at angles less than 90°. However, as long as the stagnant layer does exist, the heat transfer is substantially less, particularly if the ratio of the height to the spacing is large. The reason for this last provision is that the heat transfer at the top and bottom where there is cross-over can be quite significant. Our invention will supress this cross-over and will do other things to supress the convective heat loss further.

Figure 11:
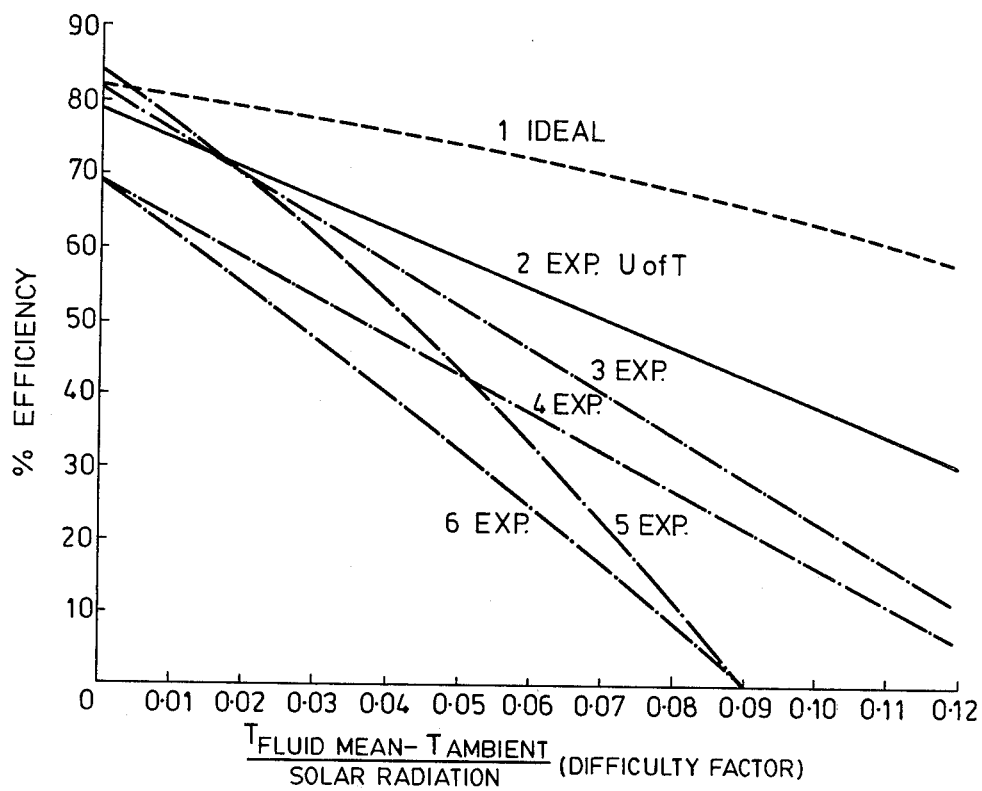
Figures 13, 14, 15:
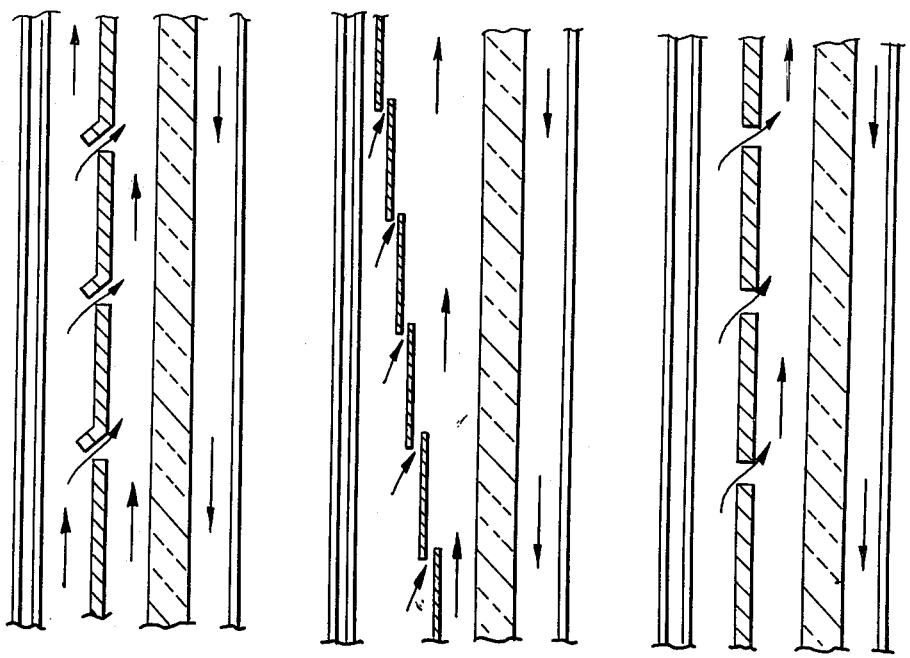
Figure 12:
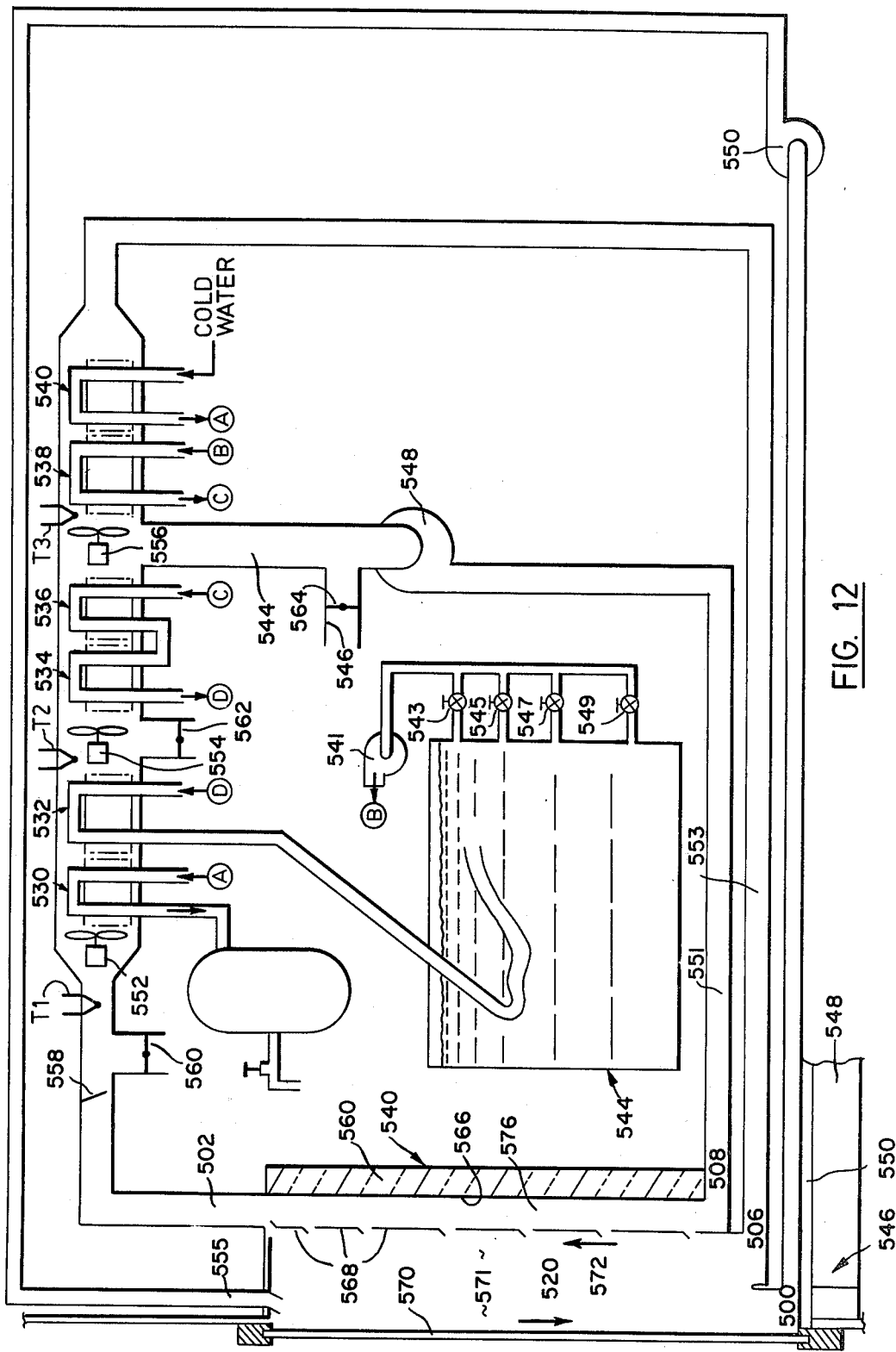

In order that the invention may be more clearly understood, reference will now be made to the accompanying drawings which illustrate a number of embodiments of the invention by way of example —FIG. 9 is a perspective view of a dwelling house having a solar energy collection system; FIG. 10 is a vertical sectional view through an experimental vertical air/water solar heating collector; FIG. 11 compares the performance on the experimental collector of FIG. 10 with conventional systems; FIG. 12 is a diagramatic illustration of a solar energy collection system according to a second embodiment of the invention; and FIGS. 13, 14 and 15 are diagramatic illustrations of three possible modifications of this system as shown in FIG. V.

FIG. 10 shows a collector designed to test the effectiveness of certain aspects of this patent as work in partial fulfillment and requirements for the degree of Master of Science. It consists of a wooden box 350 open to the front as shown and contains the working parts of the apparatus. The sun enters through two plastic panels 352 and 354 and strikes the black collector plates 356, each of which is one foot high and has a lid as shown, which is formed by bending one inch of the metal at an angle of roughly 45°. The solar heat is transferred to the air within the space between the inner plastic sheet 352 and the collector plates 356, and forms a current of warm air flowing upward on each plate and being transferred by the lid to the space behind the plate as shown. There is similarly a current of cold air flowing down the inside surface of the transparent plastic 352 in the present embodiment this cooled down flow crosses to the back at the bottom of this space and eventually joins the warm upflow 360. Replacement air to form the downflowing air and the upflowing air, come in through openings at the bottom 362, and at the top to the front at 364. Behind the black collector plates at a sufficient distance to provide a duct for the upper flowing hot air is another surface which is roughened to generate secondary air currents and turbulence and thus improve heat transfer from itself and from the facing collector plates at 356. The back of the collector plates and the front of this metal sheet are painted black to enhance radiant heat transfer between them so that both surfaces can transfer heat to the air in the duct that is formed. The system has been operated on both natural convection alone and with the use of the blower at 368. In the case of natural convection the hot air passes through the stationary blower and through the water-/air to water heat exchanger 370 which cools the air so that it enters the downflow duct 376 with a higher density than before. The blower 368 is designed to increase the heat transfer coefficient to the heat exchanger more than to increase the circulation and thus the heat transfer in the duct 359. The heat transfer is enhanced further by recycling air through 366 and thus increasing the velocity through the heat exchanger and air can also return to opening 372 to duct leading back into the top of the collector at 364 to provide make up and air for the down flowing cold stream. It would have been more effective to have used a cooler air stream such as from the house or by recycling air directly from the bottom of the collector adjacant to the transparent panel up to the top at location 364. Another alternative would be to draw in cold ventilating air from outside and have it enter at location 364 instead. A flow in several directions is controlled by dampers provided at 374 on the return of air to the top of the collector and at 366 to control the air recycled to the heat exchanger. This collector also utilized a reflector at 378 to increase the heat flux into the collection system.

FIG. 11 compares the performance of this embodiment of the invention with standard designs using water and using air as working fluids and described previously in this disclosure as case 2 and case 4. The curves plotted for the standard cases are based on the equations developed by Klein from data on almost a thousand sets of experimental data. These comparative cases show the performance both with a nonselective black as is normally the case and with the significant improvement provided by the use of a selective black. These are compared with experimental results, curve 2, in this embodiment of the invention and with the theoretical predicted performance of a perfect embodiment of the inventions. The Y-axis displays the percent of the solar energy delivered by the working fluid while the X-axis is essentially a difficulty factor, proportional to the temperature difference between the fluid and the ambient temperature and inversely proportional to the intensity of the solar radiation. All collectors perform reasonably well when the difficulty is low such as at high noon on a clear day when the sun is at a good angle, and when the temperature difference is small, but the curves separate as the difficulty increases. As the overall performance depends a great deal upon performance at times other than high noon and on days that are slightly to substantially overcast and on days when the ambient temperature is cold, it is this performance at a greater difficulty that is the most important and it is under these conditions that the present invention shows the greatest advantage. It should be noted that its performance need not be better than that of collectors 3 and 5 to be advantageous over them in that they cost very much more.

The collectors discussed thus far must be a part of a complete system for providing heat and/or air conditioning to a building. FIG. 12 shows one such system embodying various aspects of the present system. This system provides both for direct use of hot air in the building and storage of the heat for later use in a hot water storage tank. It also shows some of the air-water heat exchangers being used to heat domestic hot water and others could be used to heat the working fluid of a refrigeration cycle. The storage of the heat in hot water in a departure from the usual pattern of storing the heat in rocks when air is the working fluid. The present system could indeed store the heat in rocks.

The drawing shows a vertical sectional view through part of the wall 540 of the house. Heat exchangers are indicated at 530, 532, 534, 536, 538 and 540 and a water storage tank at 544. Part of the basement wall of the house is visible at 546 and supports the floor joists 548, and the floor covering 550 in a conventional fashion. The wall frame, comprising vertical studs, extending between plates and headers, is not seen in this cut but would surround the layer of insulation 560, which may form the rear wall of the collector or may be covered by a surface 566, which in turn would form the rear wall of the collector. If a rear wall at 566 is used, it will most likely be blackened to absorb long wavelength radiation and roughened to improve heat transfer from itself and also to increase turbulence and to improve heat transfer elsewhere in the duct as well. The return air ducts 551, 553 and 555, are shown for convenience on the right hand side of the drawing, but they would in fact, most likely be installed as rectangular air ducts in the space between the wall framings as well. The collector itself is completed by the black collector panels at 568 and the glass cover 570. Channels are formed between the glass and the collector plates indicated at 571 and between the collector plates and the insulation is indicated by 576. Cold air, 520, flows down the rear face of the glass and hot air, 572, flows up along the front of each collector panel. It is scooped off before and forced into the channel 576. The hot air in channel 576 is carried through a duct 502, past a light plastic check valve, 558, and vents to a set of finned air-water heat exchangers, 530, 532, 534, 536, 538 and 540. Fans, 552, 554 and 556, increase the turbulence and heat transfer coefficient and aid the flow. These fans are of low power and may or may not be present or may be present at certain points. The same heat exchangers can also be used to transfer heat from hot water to the building air at night by the opening of the damper at 560 and 562 so the air can be drawn into the heat exchanger section and out again during times the collector itself is not operating. In addition, 562 may be open while 560 is not, in order to permit hot air from the collector which has delivered some heat to the water through the heat exchangers to enter the building and to provide building heat directly. For convenience, and to avoid cluttering the drawing with excessive pipes, letters have been used to indicate piping connections. For example, water from the hot water storage 544 is drawn through a selected valve, one of 543, 545, 547 or 549 and through a pump 541 and delivered to the second to last heat exchanger at position B. The water flows through the heat exchanger bank countercurrent to the air fluid. Thus, the exchangers are piped to connect C to C to carry the water that is being heated to the middle of the two heat exchangers and D is connected to D to carry water into the first heat exchanger and from thence back to hot water storage. The hot water is introduced into hot water storage tanks through a thin walled plastic tubing, which will float to the appropriate level to deliver the water, since the density of the tubing plus the water coming through it will be essentially the density of the water in the tank at the same temperature. This embodiment also shows the first and last heat exchanger being used to heat domestic water. The cold water that remains is used to cool the air from the collector to the lowest possible temperature before it returns through the return duct 553. Warmer air is removed through duct 544 either to be introduced to the house through the damper 564 and through duct 546 or to pass through blower 548 and through return air duct 551 to enter the back of the collector. It is unlikely that this entire system would be used except throughout relatively large buildings as it is relatively complex. Control of such a complex system would involve a number of thermocouples, some of which are shown at T1, T2 and T3. The system would come into operation whenever the collector was collecting useful heat or whenever the building needed heat or both. If the collector is collecting useful heat, hot air will be produced which will attempt to flow by a natural convection opening the check valve at 558 and activating the thermocouple at T1, which, depending on the temperature available, will activate one or more of the fans or blowers to aid in the heat transfer. When the sun is no longer shining sufficiently to provide useful heat, the temperature at T1 will drop and the associated fans will shut down. When the building needs heat, dampers at 560, 562 and/or 564 will open up and the blower(s) (not shown) used to distribute heat through the building will turn on. The thermocouples with the heat exchangers can be used to activate the pump 541 from the hot water storage tank and an appropriate valve to deliver either relatively cool water to recover heat from the hot air or relatively warm water to provide heat to the building air. The domestic hot water, ideally would work from a natural convection loop relative to the heat exchanger 530, but would draw in cold water into heat exchanger 240 when the domestic hot water is used. Alternatively, the domestic hot water system could operate with a pump and with control valves in the manner of the hot water storage tank. For a large system such as is implied in the present disclosure, a microprocessor costing three to five hundred dollars could be used to provide elaborate control. Alternatively, in simpler systems, a relatively simple system to be used for control of the operation involving the solar collector. Natural convection would start the flow of hot air from the collector either directly into the building or into a chamber containing air-water heat exchangers or containing stone storage media. A thermostat responding to the hot air can be used to turn on an additional fan(s) or blower(s). The control of air flow from the building through the storage media and back into the building would be controlled as it is now in a house heating system by a thermostat responding to the building temperature at some point. Alternatively, if the heat is stored in hot water, then hot water can flow to old fashioned radiators by natural convection or to newer fan coil units under normal control.

Consider the collector alone. The radiant heat flow between black panel and transport cover is easily suppressed (1/10x) by use of a selective black surface. Supression of the convection losses is more complex. Consider the downflowing cold air and the upflowing hot air separately. The rate of flow of the downflowing cold air on the transparent surface, the boundary layer thickness and flow characteristics including turbulence and the heat transferred to the cold surface all depend on the difference in temperature between the cold surface and the stagnant central air core and the overall height of the cold surface. If this central air core can be kept cold so as to minimize the temperature difference between it and the transparent surface, then the boundary layer flow will be slow and laminar and the amount of heat transfer will be relatively small. To do so however, means that we must break the symmetry which normally exists between the flow on the hot side or black collector and the flow on the cold side which in a sealed chamber leads to the central core temperature being exactly half way between the temperature of the cold surface and the temperature of the hot surface. The temperature of the hot black collector must be substantially higher than that of the central core without the development of a high velocity turbulent thick boundary layer which would transfer a great deal of heat to the central core air and raise its temperature. This is done by taking strips of sheet metal between one and two feet wide and mounting them as shown in FIGS. 13, 14 and 15 so that this one or two feet dimension is placed in the vertical direction and so that the hot air that is developed in the boundary layer on the front surface of this black collector plate is transferred to the rear. Thus, the boundary layer begins anew on each strip, and, since the distance rises is short, the boundary layer remains thin annd laminar. An additional advantage is that the heat transfer is best at the beginning of a boundary of air because the temperature gradient is very high at this point. In FIG. 13, the sheet metal is shown with a small lip bent into it to effect the transfer. In FIG. 14, the sheet metal is shown overlapping with a gap between each plate sufficiently to swallow the boundary layer. In FIG. VIII, the flow characteristics behind the plate must be such so that there is sufficient pressure drop as to create suction and entrainment at each slot. The situation shown in FIG. 15 appears simple but it implies a careful tuning of the flow in the rear channel. It is possible because with all the hot air produced on either side being placed in the rear channel and with hot air being displaced away from the wall into the central core where the buoyancy can lead to greatest increase in flow velocity, there will be essentially much in the end a Bernoulli effect which will suck air from the front to the rear. The fact that the hot air is removed from the channel in front of the black collector means that the hot air does not need to cross over at the top, but if it does not do so then cool air must be supplied at the top or at the top and at several other points to provide the downflowing stream. There are several possibilities for providing this cool air. It could be cold make-up ventilation air drawn in from the outside and introduced at this point. It could be the cold air that has been fallen to the bottom that might be returned by a small blower to the top to repeat the circuit. It could be the coolest air available from the air that has been circulated through the heat exchangers and/or through the house. In the winter, particularly if the exterior temperature is below freezing, the use of house air or even recirculated air anywhere in this front chamber involves consideration of and probably correction for the humidity it may carry. Since the boundary layer air next to the hot black collector surfaces is transferred from the front to the back, this air must be provided to the duct in front and there are several possible sources. For example, if ventilating air is drawn in from the outside, then the cold boundary layer at the bottom can be allowed to cross over to the hot side and flow up and out so that the only air introduced might be the external air. Alternatively, air from the heat exchanger circuit or from the house can be used. Again, it is advantageous that this is the coolest and dryest air available. There can of course be a humidity as well as a temperature gradient from the back of the channel to the front.

The claim that the present invention is the most cost effective method of collecting solar energy requires a discussion of the cost of installation. The collector itself has a relatively low per unit area cost because it began with a conventional insulated but unfinished wall and places in front of it first a light frame support probably of metal (because of the temperatures involved). Upon this frame, which consists primarily of vertical stringers with a few cross braces and a few supports from the wall (probably at a spacing of 16"), would be mounted light weight copper sheets which would be riveted or screwed or bolted to the stringers from scaffolding or even from a person suspended from the eave such as a window washer by a Bosson's chair. These light weight sheets could be easily handled on the scaffolding or handled with pulleys so that the work could be done by one or two men easily with very little physical exertion and quite rapidly. The sheets themselves would be standard copper sheets from reels which have been electroplated to create the chrome black at a cost of presently 70¢ per square foot and bent on the site. Both of these are standard operations with simple and inexpensive equipment. There must be connections made at the top and bottom for the introduction and removal of the air. The remaining vertical surface is a glass surface mounted in some standard weather tight way as is done on many office buildings. The cost might be slightly greater because it will be suspended further from the wall but basically the costs of the glass cover would be the same as using it as siding and windows as in the popular and economic "curtain wall" office building. The cost of the siding required to complete the building would be deducted from the cost of the collector since it would be required in any case. In addition to the collector, there must be ducts to take the heat from the collector to the points of use and to return air to the collector. The ducting would be similar in type and in cross sectional area to the ducting used in carry hot air throughout the house except that the ducting would be concentrated in the wall behind the collector and between the collector and heat exchangers. Conventionally the heat exchangers for heating the air of the house are located in the basement because furnaces are located in the basement, but in this case heat exchangers would be required at a high point such as the attic of a home or an upper storey of a large building. It is hoped from the action of natural circulation would aid control of the process.

Heat exchangers in the enclosure and the floor will not be much different in that an ordinary house system except that the area of heat exchange may be greater. Ducts leading from here to the rest of the house may be slightly but not much longer, than from those leading from the basement, since the air is most conveniently introduced at floor level. The total system may operate with relatively simple controls for the collector part of the system depending upon natural convection to indicate when hot air is available from the collector. Alternatively, a sophisticated micro processor can now be obtained for less than a thousand dollars which will give a complex degree of control of the entire system. There is a requirement that the hot water must be carried from the attic heat exchangers to and from the basement storage reservoir. This is not a great problem. As the house is being built it can be run along with the bathroom plumbing and there are no special requirements for these hot water lines.

Let us compare the present collector system with references which were described earlier. It resembles the TROMBE WALL in that it is relatively inexpensive and easy to construct and operates at least to a degree on natural convection but it differs in that it operates at high efficiency while the TROMBE WALL operates at low efficiency. The more common air collector has the air between the black collector surface and the transparent panel stagnant to act as an insulator and obtain heat transfer by a rapid flow of air along the back of the metal plate which frequently has an extended surface. This is also relatively inexpensive to construct, but the power consumption for the air blower is high compared to the present design and the unit is not much more efficient than the TROMBE WALL while our present design is highly efficient. The Lof design operates upon air and is highly efficient but there are several important distinctions. The system is shown in all the drawings as sloped in such a way that it cannot operate effectively in natural convection and indeed does not mention natural convection, while the present invention is designed to obtain maximum benefit from natural convection. The primary component of this collector designed by Lof are the relatively narrow glass plates which are closely spaced and substantially overlapped leading to a heavy collector and a very large area of glass per square foot of collector, both of which contribute to high cost (through the material cost) and the difficulty of handling (weight). The glass plates require special preparation of painting half of one side black which might be reasonable in cost once very large scale productions has been established, but would be an expensive operation otherwise. The insulation of all of these glass sheets carefully aligned with each other would be an expensive operation at any time. In contrast, the present invention achieved comparable efficiencies with the use of readily available material which is light in weight and inexpensive to install as well as to prepare. The typical water operated collectors also compare reasonably well with present invention on efficiency although the present invention is more efficient, but they are far more costly to build, install, and maintain and are subjected to hazards such as freezing on winter nights, if they fail to be drained, or excessive pressure build-up in the summer, if they are filled and inactive. In short, none of these collectors compare at all well with the present in terms of cost effectiveness although some can compare well on either cost or effectiveness.

Air Conditioning

Particularly in the summer, the present collector design can prepare air at quite high temperatures and this can be used to operate a heat pumping system to cool and dehumidify the air of the summer. This high temperature heat can be used to drive an absorption refrigeration system similar to that which has been used by Servel for refrigerators for many years. To do so, the appropriate liquid, most commonly lithium bromide solution in water, today would be passed through a finned heat exchanger similar in type to that used in this invention to transfer the heat from the air to the water or the water to the air, except that it would be of a material suitable for use with lithium bromide solution. The lithium bromide solution would be heated to a high enough temperature that water vapour would be removed at a high enough pressure to condense when it is cooled in a later heat exchanger. This cooled (but presumably still warm) water liquid then passes through an expansion valve into a low pressure chamber where it evaporates at a low temperature picking up heat and cooling the air on the other side of the tube wall as in any refrigerator or air conditioner. This vapour must then be removed. Instead of removing it by pumping, as in the conventional mechanical refrigerator or air conditioner, it is removed by contacting it with the concentrated lithium bromide solution from the first step (which, however, has now been cooled so that it absorbs the water vapour). There are commercial units available that operate on this principle and all that would be necessary would be to hook them into the heat exchanger that provides the hot lithium bromide solution. The commercial systems however, certainly at present have a fairly high minimum temperature at which they operate which will reduce the efficiency of this collector.

Another system which is more flexible in operating temperature and which has direct application to problems of winter operation of the collector is to use an absorbent solution to humidify and dehumidify air. For example, ethylene glycol will absorb water vapour at a low temperature and desorb it at a high temperature. If our hot air is contacted with a spray of ethylene glycol it will strip water from it. If this ethylene glycol is then cooled toward ambient temperature in a heat exchanger and then sprayed into ambient air, the glycol would absorb water vapour and substantially dehumidify the air. To obtain cooling, water can be sprayed into the air either before or after dehumidification causing it to be cooled down. If the water is sprayed before dehumidification, then the result is a drier air which is not cooled very much while if the water spray follows dehumidification we get the coolest air but the most humid. Obviously more than one stage of alternate spraying with water and with ethylene glycol can be used to obtain cool dry air. In the winter, the same type of system could be used to humidify the hot air from the collector as it goes into the house and therefore make it more comfortable and also to dehumidify and clean the air from the house going into the collector to avoid humidity problems in the collector itself.

It should be noted that the collector itself could be operated with other means of storing heat such as the conventional rock storage bins or alternatively bins containing sealed plastic milk bags filled with water.

What I claim is:

1. A solar energy collector in which air is the working fluid and which comprises: a solar energy absorbent body having a surface which is exposed to sunlight in use and from which solar energy absorbed by the body can be transmitted as sensible heat; a panel which is transparent to sunlight and which is disposed at the exterior of said body and spaced therefrom so as to define therewith a first air passageway in front of said body; means defining a second air passageway behind said body and having a heated air outlet adjacent an upper end thereof; and an inlet for air to be heated, communicating with said first air passageway;

said panel being spaced from said absorbent body by an amount sufficient to permit the formation of respective hot and cold boundary layers of air on opposed surfaces of said solar energy absorbent body and panel respectively and to allow for a buffer zone between said boundary layers for supressing convective heat transfer from the body;

and said body comprising a panel having an outer surface which defines said surface exposed to sunlight and which is coloured a selective dark colour to supress heat loss by radiation, said panel being intended to be disposed at an angle greater than about 80° to the horizontal when the collector is installed and being formed with a plurality of vertically spaced transverse openings defined by respective upper and lower edges, of which the upper edges are spaced outwardly of the lower edges so as to cause transfer from said first air passageway to said second air passageway of boundary layers of heated air formed on said outer surface of the panel in use, whereby said layers of air are not permitted to become large enough or turbulent enough to transfer significant amounts of heat to said buffer zone of substantially stagnant air in use.

2. A solar energy collection system comprising a solar energy collector as claimed in claim 1 installed in a building having heat receiving means, the collector being disposed with its said solar energy absorbent body panel at an angle greater than about 80° to the horizontal and the system further comprising air-liquid heat exchange means; conduit means coupling said second air passageway with said heat exchange means; and means coupling said heat exchange means with said heat receiving means.

3. A solar energy collector in which air is the working fluid and which includes: a solar energy absorbent body having a surface which is exposed to sunlight in use and from which solar energy absorbed by the body can be transmitted as sensible heat; a panel which is transparent to sunlight and which is disposed at the exterior of said body and spaced therefrom so as to define therewith a first air passageway in front of said body; and means defining a second air passageway behind said body; said second air passageway having an inlet and an outlet and said collector being arranged with said outlet higher than said inlet so that air to be heated can flow through said passageway and absorb heat from said body; means for introducing unheated air adjacent to an inner surface of said transparent panel so as to form a downwardly moving cold boundary layer on said panel; and means adjacent to said body at the top of the first air passageway to transfer heated air to said second passageway, whereby heat loss from the solar energy absorbent body to said transparent panel and then to ambient air is reduced by preventing cross-over of heated air at the upper end of said first air passageway.

4. A solar energy collection system comprising a solar energy collector as claimed in claim 3 installed in a building having heat receiving means, wherein the system further comprises air-liquid heat exchange means; conduit means coupling said second air passageway with said heat exchange means; and means coupling said heat exchange means with said heat receiving means.

5. A system as claimed in claim 4 wherein said heat receiving means includes a hot air heating system for the building, and wherein said conduit means is adapted to direct heated air from said second air passageway selectively directly to said hot air heating system and to said heat exchange means.

6. A system as claimed in claim 4, wherein said heat exchange means includes a plurality of separate heat recovery sections to which heat is transferred from said heated air and which are adapted to supply heat to individual heat receiving means.

7. A collector as claimed in claim 3 wherein said means for introducing unheated air is adapted to introduce fresh ambient air into said first air passageway, whereby said air serves to improve the efficiency of the collector and then passes into said second air passageway for heating.

8. A collector as claimed in claim 3, wherein said transparent panel is spaced from said absorbent body by amount sufficient to permit the formation of respective hot and cold boundary layers of air on opposed surfaces of said solar energy absorbent body and panel respectively and to allow for a buffer zone between said boundary layers for supressing convective heat transfer from the body, and wherein said solar energy absorbent body comprises a panel formed with a plurality of vertically spaced transverse openings providing communication between said first and second air passageways, said openings being defined by respective upper and lower edges of which the upper edges are spaced outwardly of the lower edges so as to cause transfer from said first air passageway to said second air passageway of boundary layers of heated air formed on the outer surface of said panel in use.

9. A collector as claimed in claim 1 or 8, wherein said panel defining the solar energy absorbent body comprises a plurality of plates spaced from one another to define said openings, and offset with respect to one another so that the bottom edge of an upper plate is spaced outwardly with respect to the top edge of the plate below so as to cause said transfer of boundary layers of heated air.

10. A solar energy collector in which air is the working fluid and which includes: a solar energy absorbent body having a surface which is exposed to sunlight in use and from which solar energy absorbed by the body can be transmitted as sensible heat; a panel which is transparent to sunlight and which is disposed at the exterior of said body and spaced therefrom so as to define therewith a first air passageway in front of said body; and means defining a second air passageway behind said body; said second air passageway having an inlet and an outlet and said collector being arranged with said outlet higher than said inlet so that air to be heated can flow through said passageway and absorb heat from said body; means for introducing unheated air adjacent to an inner surface of said transparent panel so as to form a downwardly moving cold boundary layer on said panel; means adjacent to said body at the top of the first air passageway to transfer heated air to said second passageway, whereby heat loss from the solar energy absorbent body to said transparent panel and then to ambient air is reduced by preventing cross-over of heated air at the upper end of said first air passageway; means for removing unheated air from the bottom of the first air passageway adjacent to said transparent panel and delivering said unheated air to the upper part of said air passageway adjacent to said transparent panel; and means for introducing air to be heated at the lower end of said first air passageway adjacent to said solar energy absorbent body.

* * * * *